United States Patent
Kim et al.

(10) Patent No.: US 7,414,695 B2
(45) Date of Patent: Aug. 19, 2008

(54) LIQUID CRYSTAL DISPLAY PANEL

(75) Inventors: Bong Chul Kim, Daegu (KR); Myung Woo Nam, Gyoungsangbok-Do (KR); Kyung Kyu Kang, Gyoungsangnam-Do (KR)

(73) Assignee: LG Display Co., Ltd., Seoul (KR)

( * ) Notice: Subject to any disclaimer, the term of this patent is extended or adjusted under 35 U.S.C. 154(b) by 16 days.

(21) Appl. No.: 10/819,350

(22) Filed: Apr. 7, 2004

(65) Prior Publication Data

US 2004/0257501 A1    Dec. 23, 2004

(30) Foreign Application Priority Data

Apr. 7, 2003    (KR) .................. 10-2003-0021759

(51) Int. Cl.
*G02F 1/1339*    (2006.01)
(52) U.S. Cl. ..................... 349/155; 349/153
(58) Field of Classification Search .............. 349/153, 349/155
See application file for complete search history.

(56) References Cited

U.S. PATENT DOCUMENTS

| | | | | |
|---|---|---|---|---|
| 5,432,626 A | * | 7/1995 | Sasuga et al. | 349/58 |
| 5,504,601 A | * | 4/1996 | Watanabe et al. | 349/42 |
| 5,739,888 A | * | 4/1998 | Ogura et al. | 349/153 |
| 6,340,998 B1 | * | 1/2002 | Kim et al. | 349/48 |
| 6,392,735 B1 | * | 5/2002 | Tani | 349/156 |
| 6,654,084 B1 | * | 11/2003 | Marukawa et al. | 349/110 |
| 6,750,929 B2 | * | 6/2004 | Nagashima et al. | 349/110 |
| 2001/0000439 A1 | * | 4/2001 | Ohta et al. | 349/141 |
| 2003/0016328 A1 | * | 1/2003 | Chung et al. | 349/149 |
| 2005/0237466 A1 | | 10/2005 | Chung et al. | |

FOREIGN PATENT DOCUMENTS

| | | |
|---|---|---|
| CN | 1165312 | 11/1997 |
| CN | 1355896 | 6/2002 |
| CN | 1397822 | 2/2003 |
| JP | 08-278507 | 10/1996 |
| JP | 09-211473 | 8/1997 |
| JP | 10-325951 | 12/1998 |
| JP | 2000-338474 | 12/2000 |
| JP | 2002-139725 | 5/2002 |
| KR | 01-234826 | 9/1989 |
| KR | 10-1997-0016673 | 4/1997 |
| KR | 100142831 B1 | 4/1998 |
| KR | 10-2002-0017189 A | 3/2002 |

OTHER PUBLICATIONS

Korean Office Action issued on May 15, 2005, corresponding to Korean Patent Application No. 10-2003-0021759.
Korean Office Action issued on Jul. 25, 2005, corresponding to Korean Patent Application No. 10-2003-0021763.
Korean Office Action issued on Jan. 31, 2005, corresponding to Korean Patent Application No. 10-2003-0021763.

* cited by examiner

*Primary Examiner*—Michael H Caley
(74) *Attorney, Agent, or Firm*—McKenna, Long & Aldridge LLP

(57) ABSTRACT

A liquid crystal display panel includes a black matrix formed of a resin material, formed at a predetermined region extended from one end portion of a first substrate and at a boundary region of pixel areas; a color filter formed so as to correspond to the pixel areas; a seal pattern formed at an upper surface of the black matrix; and a second substrate attached to the first substrate by the seal pattern.

17 Claims, 9 Drawing Sheets

LIQUID CRYSTAL DISPLAY PANEL

This application claims the benefit of Korean Patent Application No. 10-2003-0021759 filed on Apr. 7, 2003, which is hereby incorporated by reference in its entirety for all purposes as if fully set forth herein.

BACKGROUND OF THE INVENTION

1. Field of the Invention

The present invention relates to a liquid crystal display panel, and more particularly, to a liquid crystal display panel capable of preventing the use of heavy metal harmful to the human body in forming a black matrix and minimizing an area of a dummy region except an effective image display part.

2. Discussion of the Related Art

In general, a liquid crystal display apparatus is a display device in which data signals including image information are individually supplied to unit pixels arranged in a matrix form, and the light transmittance of the unit pixels is controlled to display a desired image.

Thus, the liquid crystal display device includes a liquid crystal display panel where the unit pixels are arranged in a matrix form, and a driver integrated circuit (IC) for driving the unit pixels.

In the liquid crystal display panel, a thin film transistor array substrate and a color filter substrate are attached to each other so as to face into each other and have a certain interval (generally, referred to as a cell-gap) therebetween, and, at the cell-gap, a liquid crystal layer is formed.

The thin film transistor array substrate and the color filter substrate are attached to each other by a seal pattern formed along the outer edge of an effective image display part. At this time, a spacer is formed on the thin film transistor array substrate or the color filter substrate, thereby-forming a certain cell-gap therebetween.

At outer surfaces of the substrates, a polarizing plate, a retardation plate and the like are installed. Such a plurality of components are constructed to vary the state of light and a refraction ratio of light passing through in order to have a liquid crystal display device having a high brightness and a contrast characteristic.

At the liquid crystal display panel where the thin film transistor array substrate and the color filter substrate face into and are attached to each other, a common electrode and a pixel electrode are formed to apply an electric field to the liquid crystal layer. That is, a voltage applied to the pixel electrode is controlled while a voltage is applied to the common electrode, thereby individually controlling light transmittance of the unit pixels. In order to control the voltage applied to the pixel electrode for each unit pixel separately, a thin film transistor used as a switching device is formed at each unit pixel.

Liquid crystal display devices are generally classified into twisted nematic (TN) mode liquid crystal display panels and in-plane switching (IPS) mode liquid crystal display panels.

In the TN mode liquid crystal display panel, a pixel electrode is formed on a thin film transistor array substrate at each unit pixel, and a common electrode is formed at an entire surface of a color filter substrate. Thus, a liquid crystal layer is driven by an electric field between the pixel electrode formed on the thin film transistor array substrate and the common electrode formed on the color filter substrate.

In the IPS mode liquid crystal display panel, a pixel electrode and a common electrode are formed on a thin film transistor array substrate at a predetermined interval then. Thus, a liquid crystal layer is driven by a horizontal electric field between the pixel electrode and the common electrode formed on the thin film transistor array substrate.

FIG. 1 is an exemplary view illustrating a plane structure of a liquid crystal display panel where the thin film transistor array substrate and the color filter substrate face into and are attached to each other.

In FIG. 1, the thin film transistor array substrate 101 faces into and is attached to the color filter substrate 102, and an edge of one long side thereof and an edge of one short side thereof are protruded compared to the color filter substrate 102.

At a region where the substrates 101 and 102 are attached to each other, an image display part 113 is provided, where unit pixels are formed in a matrix form to display an image. A seal pattern 116 is formed along the outer edge of the image display part 113.

A gate pad part 114 connected with gate lines of the image display part 113 is provided. At an edge region of one short side of the thin film transistor array substrate 101 that extends beyond the color filter substrate 102.

A data pad part 115 connected with data lines of the image display part 113 is provided. At an edge region of one long side of the thin film transistor array substrate 101 extends beyond the color filter substrate 102.

The gate pad part 114 supplies a scan signal supplied from a gate driver integrated circuit to the gate lines of the image display part 113, and the data pad part 115 supplies image information supplied from a data driver integrated circuit to the data lines of the image display part 113.

On the thin film transistor array substrate 101, the gate lines to which the scan signal is applied, and the data lines to which the image information is applied, intersect one another, so that the unit pixels are defined in a matrix form. At the intersection, a thin film transistor is provided for switching the unit pixel.

On the color filter substrate 102, a red, green or blue color filter corresponding to a unit pixel is provided, and a black matrix is provided to prevent a leakage of light generated from a back-light and to prevent a mixture of colors from adjacent unit pixels.

In case of the TN mode liquid crystal display panel, a pixel electrode is provided at the thin film transistor array substrate 101 and a common electrode is provided at the color filter substrate 102 to drive a liquid crystal layer. In case of the IPS mode liquid crystal display panel, a pixel electrode and a common electrode are provided at the thin film transistor array substrate 101 to drive a liquid crystal layer.

The thin film transistor array substrate 101 and the color filter substrate 102 are have a cell-gap therebetween maintained by a spacer so as to separate one from the other by a fixed distance. They are attached to each other by a seal pattern 116 formed at the outer edge of the image display part 113, and thus constitute a liquid crystal display panel 100. At one side of the seal pattern 116, a liquid crystal injection hole is provided for injecting liquid crystal between the thin film transistor array substrate 101 and the color filter substrate 102 that are attached to each other. The liquid crystal injection hole is sealed after an injection of the liquid crystal is terminated.

FIG. 2 illustrates an embodiment of a sectional structure of a color filter substrate for a region 'A' of FIG. 1 in case of the TN mode liquid crystal display panel.

With reference to FIG. 2, the color filter substrate includes a black matrix 202 made of a chrome material, formed at a predetermined region extended from one end portion of a transparent substrate 201 and at a boundary region of pixels, preventing a leakage of light generated from a back-light, and preventing a color mixture of the adjacent pixels; a red, green or blue color filter 203 partially overlapping with the black matrix 202, and formed to correspond to a unit pixel; a common electrode 204 formed on the entire surface of upper parts of the black matrix 202 and the color filter 203; and a seal pattern 205 formed on a structure that the black matrix 202 and a common electrode 204 are laminated.

In order to form the black matrix 202 on a color filter substrate of the TN mode liquid crystal display panel, a thin film made of a chrome material is deposited in a film process, such as sputtering, and the deposited thin film is patterned through a photolithography process.

The seal pattern 205 is formed on a structure such that the black matrix 202 made of the chrome material and the common electrode 204 made of a transparent metal material are laminated.

As above, for the black matrix 202 formed on the color filter substrate of the related art of TN mode liquid crystal display panel, a thin film made of a chrome material, a heavy metal to the human body, toxic is used.

FIG. 3 illustrates an embodiment of a sectional structure of a color filter substrate for a region 'A' of FIG. 1 in the case of the IPS mode liquid crystal display panel.

With reference to FIG. 3, the color filter substrate includes a black matrix 302 made of a resin material, formed at a region constantly separated from one end portion of a transparent substrate 301 and at a boundary region of pixels, preventing a leakage of light generated from- a back-light, and preventing a color mixture of adjacent pixels; a red, green, or blue color filter 303 partially overlapping with the black matrix 302, and formed to correspond to a unit pixel; an over-coat layer 304 formed at an entire surface of an upper part of a transparent substrate 301 including the black matrix 302 and the color filter 303; and a seal pattern 305, formed at an upper surface of the over-coat layer 304 formed on the edge portion of the transparent substrate 301.

Unlike the TN mode liquid crystal display panel, the black matrix 302 formed at the color filter substrate of the IPS mode liquid crystal display panel is formed of an organic film such as a resin material.

In the IPS mode liquid crystal display panel, a liquid crystal layer is driven by an electric field between a pixel electrode and a common electrode formed on a thin film transistor array substrate. Therefore, in case that the black matrix 302 formed on the color filter substrate is formed of a thin film made of a metal material such as chrome, an electric field between the pixel electrode and the common electrode is distorted thereby causing deficiency in driving the liquid crystal layer. Accordingly, the black matrix 302 formed on the color filter substrate of the IPS mode liquid crystal display panel is formed of a thick film which is made of an organic film such as a resin material.

The over-coat layer 304 is formed at an entire surface of an upper part of the transparent substrate 301 including the black matrix 302 and the color filter 303 in order to planarize the surface.

However, because the seal pattern 305 formed at the color filter substrate of the IPS mode liquid crystal display panel is formed at an upper surface of the over-coat layer 304 that is formed on the edge portion of the transparent substrate 301, a region where the seal pattern 305 is formed and separate a region where the black matrix 302 is formed are required. Thus, a dummy area is increased relative to an effective image display part, and consequently, the size of the IPS mode liquid crystal display panel must be increased. In addition, since the black matrix 302 is not formed at an edge portion of the transparent substrate 301 at which the seal pattern is formed 305 due to a problem in adhering the black matrix 302 and the seal pattern 305, light generated from a back light leaks at the edge portion of the transparent substrate 301, thereby degrading the image quality of the liquid crystal display panel.

In addition, a black matrix made of a chrome material is formed through a thin film process in the TN mode liquid crystal display panel, but a black matrix made of an organic material is formed through a thick film process in the IPS mode liquid crystal display panel. Therefore, separate individual processes for producing the color filter are performed according to the TN mode and the IPS mode, increasing the complexity of and degrading the efficiency on the use of clean rooms.

SUMMARY OF THE INVENTION

Accordingly, the present invention is directed to a liquid crystal display panel that substantially obviates one or more of the problems due to limitations and disadvantages of the related art.

Therefore, an advantage of the present invention is to provide a liquid crystal display panel in which a thin film made of a chrome material harmful to the human body is not used for a black matrix of a TN mode liquid crystal display panel.

Another advantage of the present invention is to provide a liquid crystal display panel capable of minimizing a size of a liquid crystal display panel by minimizing an area of a dummy region outside of an effective image display part of an IPS mode liquid crystal display panel.

Another advantage of the present invention is to provide a liquid crystal display panel capable of identically applying a process of forming a black matrix formed of an organic film such as a resin material in producing color filter substrates of both TN mode and IPS mode liquid crystal display panels.

To achieve these and other advantages and in accordance with the purpose of the present invention, as embodied and broadly described herein, there is provided a liquid crystal display panel according to a first embodiment including a black matrix formed of a resin material, and formed at a predetermined region extended from one end portion of a first substrate and at a boundary region of pixels; a color filter formed to correspond to a unit pixel; a seal pattern formed at an upper surface of the black matrix; and a second substrate attached to the first substrate by the seal pattern.

To achieve these and other advantages and in accordance with the purpose of the present invention, as embodied and broadly described herein, there is provided a liquid crystal display panel according to a second embodiment including a black matrix formed of a resin material, and formed at a region constantly separated from one end portion of a first substrate and at a boundary region of pixels; a color filter on the black matrix so as to correspond to a unit pixel; an over-coat layer on the first substrate having the black matrix and the color filter; a seal pattern on a structure that the black matrix and the over-coat layer are laminated; and a second substrate attached to the first substrate by the seal pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 4:
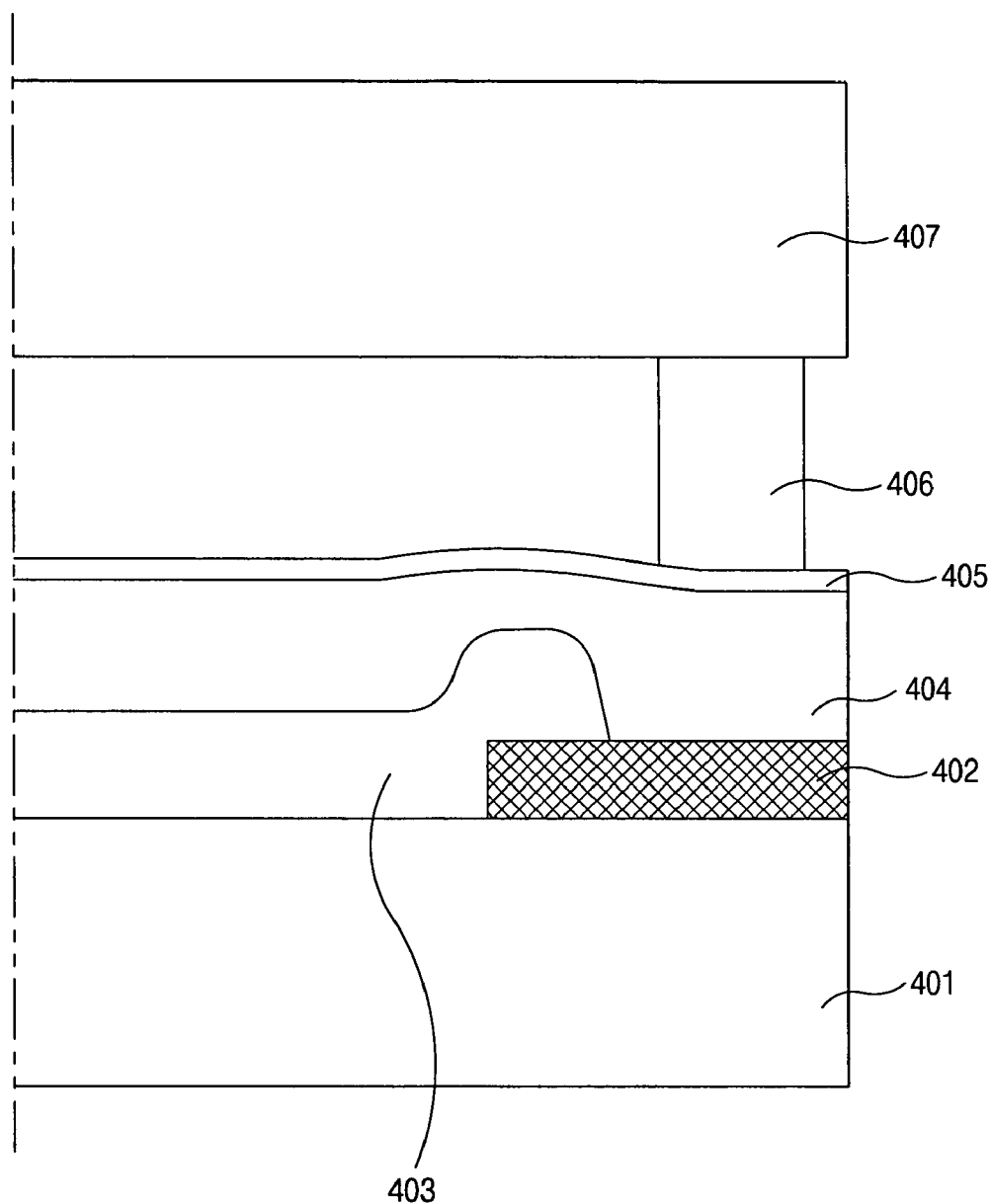
FIG. 4 is a sectional view illustrating the structure of a TN mode liquid crystal display panel according to a first embodiment of the present invention.

FIG. 4 is an exemplary view illustrating a TN mode liquid crystal display panel according to a first embodiment of the present invention.

With reference to FIG. 4, the TN mode liquid crystal display panel includes a black matrix 402 formed of an organic film such as a resin material, patterned at a predetermined region extended from one end portion of a first transparent substrate 401 and at a boundary region of the pixels to prevent a leakage of light generated from a back-light and to prevent a color mixture of the adjacent pixels. The panel also includes a red, green or blue color filter 403 partially overlapping with the black matrix 402, and formed to correspond to a unit pixel; an over-coat layer 404 formed at an entire surface of an upper part of the first transparent substrate 401 including the black matrix 402 and the color filter 403; a common electrode 405 formed at an upper surface of the over-coat layer 404; a seal pattern 406 formed on a structure that the black matrix 402, the over-coat layer 404 and the common electrode 405 are laminated; and a second transparent substrate 407 attached to the first transparent substrate 401 by the seal pattern 406.

As described above, the black matrix 402, the color filter 403, the over-coat layer 404 and the common electrode 405 are formed on the first transparent substrate 401, and the first transparent substrate 401 is applied as a color filter substrate of the TN mode liquid crystal display panel.

The black matrix 402 is formed of an organic film such as a resin material. For example, a colored organic series resin or the like such as acryl, epoxy or polyimide resin or the like including one of a carbon black material and a black pigment may be used for the black matrix.

As a support member added to the seal pattern 405, a glass fiber or a glass ball is added to the seal pattern 405 at a weight ratio of less than about 1% to sealant. If glass balls are used, about 500 or fewer glass balls may be distributed in at least one of unit area of 1 mm×1 mm of the seal pattern 406. If the glass fibers are used, about 150 or fewer fibers may be distributed in at least one of unit area of 1 mm×1 mm of the seal pattern 405. The weight ratio of the support member to sealant may be between about 0.95% and about 0.005%. Since the black matrix 402 made of resin does not adhere to the seal pattern 405 well, the seal pattern 406 may be broken after attaching the first transparent substrate 401 to the second transparent substrate 407. So, by controlling the number of the support members, the seal pattern 406 may be prevented from breaking. For example, with glass balls, a defect ratio may be about 0% when between about 0.01 and about 150 glass balls are distributed throughout the sealant, a defect ratio may be about 5% when 200 or less glass balls are distributed, a defect ratio may be about 10% when about 250 or less glass balls are distributed, a defect ratio may be about 30% when about 350 or less glass balls are distributed, a defect ratio may be about 40% when about 450 or less glass balls are distributed, a defect ratio may be about 50% when about 500 or less glass balls are distributed, and a defect ratio may be about 45% when about 550 or less glass balls are added. In case of adding the glass fiber with a diameter of about 5.2 μm and the length of about 20 μm, a defective ratio may be about 0% when between about 0.01 and about 30 glass fibers are distributed, a defect ratio may be about 10% when about 50 or less glass fibers are distributed, a defect ratio may be about 15% when about 75 or less glass fibers, a defect ratio may be about 30% when about 100 or less glass fibers are distributed, a defect ratio may be about 50% when about 150 or less glass fibers are distributed, and a defect ratio may be about 70% when about 200 or less glass fibers are distributed. The number of glass balls and glass fibers (i.e. the support members) may be varied according to their specific gravity, a weight ratio, or other ratio. The number of glass fibers may be varied according to their diameter or length. The diameter of the support member is the same as or greater than that of the spacer. If the diameter of the spacer is 4.8 μm, the support member generally has a diameter of between about 3.6 and about 7.5 μm.

In addition, by improving the adhesion of the black matrix 402 and the seal pattern 406, the black matrix may be extended to an edge portion of the first transparent substrate 401 or the second transparent substrate 407. Thus, the leakage of light which occurs in related panels because the black matrix is not formed at the edge portion of the substrate may be prevented.

The over-coat layer 404 is formed on an entire surface of an upper part of the black matrix 402 and the color filter 403 to planarize the surface. Because as black matrix 402 formed of an organic film such as a resin material is applied as a thick film, the over-coat layer 404 is formed of an organic material in order to prevent defects in driving a liquid crystal layer, which is caused by a step deficiency occurring at a region where the black matrix 402 and the color filter 403 overlap with each other. For the organic material, acryl, epoxy, a polyimide resin may be used.

On the second transparent substrate 407, gate lines to which the scan signal is applied, and data lines to which the image information is applied, intersect one another, so that the unit pixels are defined in a matrix. At the intersection, a thin film transistor for switching a unit pixel is provided, and at the unit pixel, a pixel electrode driving a liquid crystal layer with the common electrode 405 formed at the first transparent substrate 401 is provided. Thus, the second transparent substrate 407 is applied as a thin film transistor array substrate.

As stated above, the second transparent substrate 407 applied as the thin film transistor array substrate faces into and is attached to the first transparent substrate 401 applied as the color filter substrate, and an edge of one long side of the second transparent substrate and an edge of one short side thereof protrude relative to the first transparent substrate 401. At the edge portion of one short side of the second transparent substrate 407, which protrudes beyond the first transparent substrate 401, a gate pad part connected with the gate lines is provided. At the edge portion of one long side of the second transparent substrate 407, which is protruded compared to the first transparent substrate 401, a data pad part connected with the data lines is provided.

The gate pad part supplies a scan signal supplied from a gate driver integrated circuit to the gate lines formed on the thin film transistor array substrate, and the data pad part supplies image information supplied from a data driver integrated circuit to the data lines formed on the thin film transistor array substrate.

The first transparent substrate 401 and the second transparent substrate 407 constructed as above are provided with a cell-gap therebetween, maintained by a spacer, so as to be constantly separated from each other. They are attached to each other by the seal pattern, and thus constitute a liquid crystal display panel. At this time, at a region where the first transparent substrate 401 and the second transparent substrate 407 are separated from each other, a liquid crystal layer is formed. The seal pattern 406 may be formed on the first transparent substrate 401 or the second transparent substrate 407.

The seal pattern 406 may be formed in a variety of plane shapes depending on a method for forming the liquid crystal layer. The method of forming the liquid crystal layer may be classified into vacuum injection methods and dropping methods.

In the vacuum injection method, a liquid crystal injection hole of a liquid crystal display panel is dipped in a container filed with the liquid crystal in a vacuum chamber, and then the liquid crystal is injected into the liquid crystal display panel by the pressure difference between the inner side and the outer side of the liquid crystal display panel by varying the pressure of the vacuum. After the liquid crystal fills in the liquid crystal display panel, the liquid crystal injection hole is sealed, thereby forming a liquid crystal layer of the liquid crystal display panel.

The liquid crystal injection hole in the vacuum injection method is defined as an open region of one side of the seal pattern 406. Accordingly, when forming a liquid crystal layer on the liquid crystal display panel through the vacuum injection method, one side of the seal pattern 406 is formed to be open so that it functions as a liquid crystal injection hole.

However, the vacuum injection method as described above has the following problems.

In the vacuum injection method, it takes a long time to fill the liquid crystal in the liquid crystal display panel. In general, the attached liquid crystal display panel with an area of several hundred square-centimeters ($cm^2$) has a cell gap of a few micrometers (μm). Thus, even with the vacuum injection method, the amount injected of liquid crystal per unit time is quite small. In addition, as the size of the liquid crystal display panel increases, the time required to fill the liquid crystal panel is accordingly lengthened and deficiencies in filling the liquid crystal may occur. Therefore, the vacuum injection method cannot be used for a large-scale liquid crystal display panel.

In addition, too much liquid crystal is in the display panel consumed in the vacuum injection method. In general, an actual amount of the liquid crystal is very small compared to the amount of the liquid crystal in the container. When liquid crystal is exposed to the air or a specific gas, it reacts with the gas and becomes degraded. Thus, even if the liquid crystal filled in the container is used to fill to a plurality of liquid crystal display panels, a large amount of the liquid crystal still remaining after the filling process is discarded. As a result, the unit price of the liquid crystal display is increased.

In order to overcome such problems of the vacuum injection method, recently, a dropping method is adopted.

In the dropping method, the liquid crystal is dropped and dispensed at an image display part of the first transparent substrate 401 or the second transparent substrate 407, so that the liquid crystal is uniformly distributed on the entire image display part by the pressure generated when the first transparent substrate 401 and the second transparent substrate 407 are attached to each other, thereby forming a liquid crystal layer.

When forming the, liquid crystal layer through the dropping method, the liquid crystal is not filled from the outside but directly dropped on the substrate. Thus, the seal pattern 406 is formed to have a closed pattern shape to encompass the outer edge of the image display part in order to prevent an external leakage of the liquid crystal from the image display part.

In the dropping method, the liquid crystal may be dropped within a short time compared to the vacuum injection method. Thus, for a large-sized liquid crystal display panel, a liquid crystal layer can be quickly formed between the substrates.

In addition, since only the required amount of liquid crystal is dropped on the substrate, the unit price of the liquid crystal display panel can be kept low.

Unlike the vacuum injection method, in the dropping method, the first transparent substrate 401 and the second transparent substrate 407 are attached to each other after the liquid crystal layer is formed.

In the dropping method, if the seal pattern 406 is formed of a thermo-hardening sealant, the sealant may be flowed out in a later process of attaching the first transparent substrate and the second transparent substrate, whereby the dropped liquid crystal may be contaminated. Accordingly, in the dropping method, a ultraviolet (UV)-hardening sealant may be used for a seal pattern 406, or a mixture of the ultraviolet-hardening sealant and the thermo-hardening sealant may be used.

In the TN mode liquid crystal display panel according to the first embodiment, a black matrix 402 is formed of an organic film such as a resin material and is applied as a thick film on the first transparent substrate 401 as a color filter substrate. In this regard, chrome, heavy metal harmful to the human body, can be avoided in fabrication.

In addition, in order to improve the adhesion of the black matrix 402 and the seal pattern 406, the number or the ratio of support members can be controlled.

Figure 5:
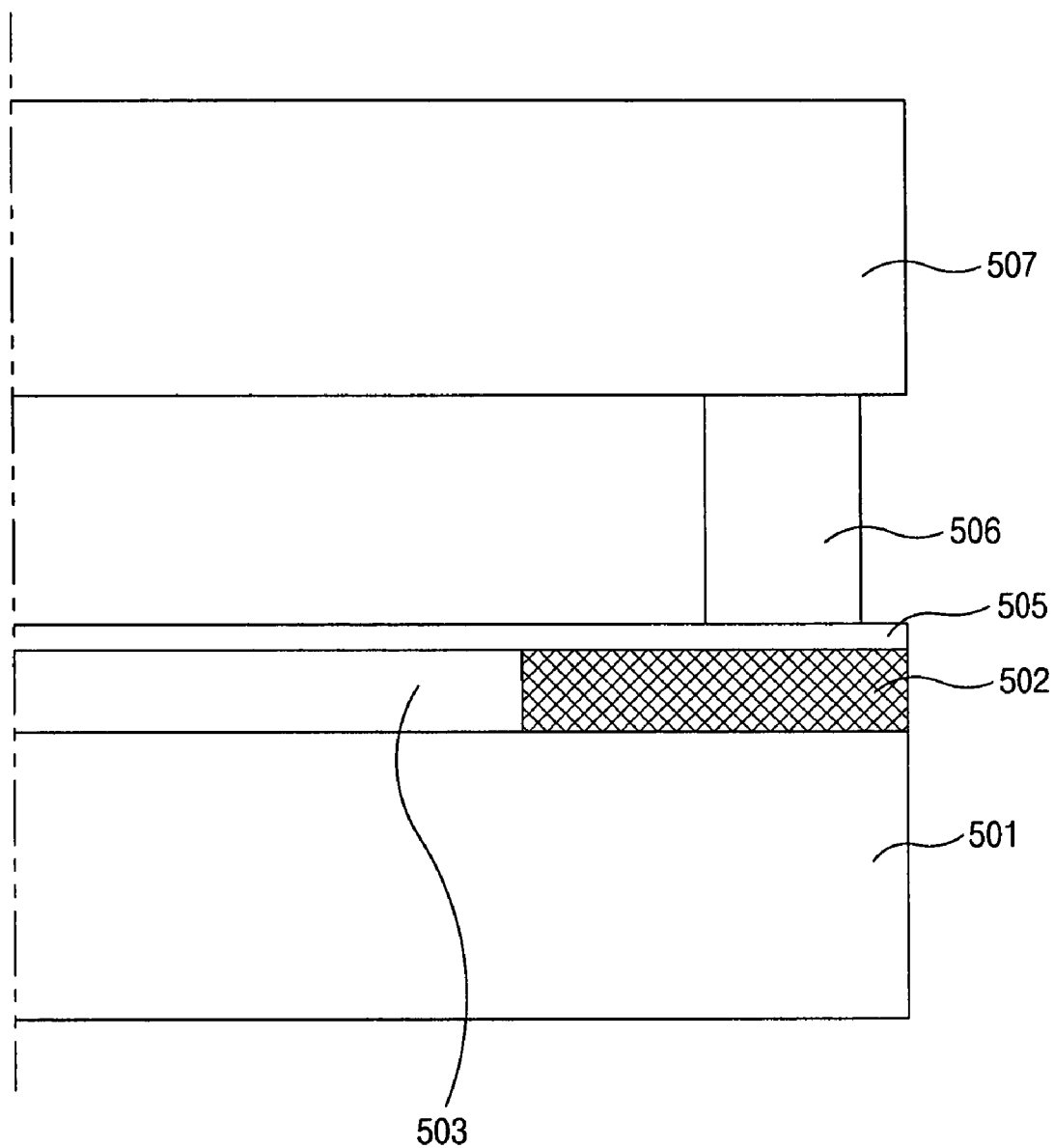
FIG. 5 is a sectional view illustrating the structure of a TN mode liquid crystal display panel in which an over-coat layer is not formed, in FIG. 4.

FIG. 5 is an exemplary view illustrating a sectional structure that an over-coat layer 404 is not formed in a TN mode liquid crystal display panel according to one embodiment of the present invention illustrated in FIG. 4.

With reference to FIG. 5, the TN mode liquid crystal display panel includes a black matrix 502 formed of a resin material, patterned at a predetermined region extended from one end portion of a first transparent substrate 501 and at a boundary region of pixels to prevent a leakage of light generated from a back-light and to prevent a color mixture of adjacent pixels. A red, green and blue color filter 503 are formed to correspond to the pixels and a common electrode 505 is formed at an entire surface of the upper part of the first transparent substrate 501 including the black matrix 502 and the color filter 503. A seal pattern 506 is formed on the structure that the black matrix 502 and the common electrode 505 are formed on, and a second transparent substrate 507 is attached to the first transparent substrate 501 by the seal pattern 506.

The over-coat layer 404 illustrated in FIG. 4 is not formed in a sectional structure of the liquid crystal display panel illustrated in FIG. 5 because the color filter 503 and the black matrix 502 do not overlap with each other.

That is, in FIG. 4, because the black matrix 402 formed of an organic film such as a resin is applied as a thick film, the over-coat layer 404 is formed of an organic material in order to planarize the surface in order to prevent deficiency in driving a liquid crystal layer, which is due to step deficiency at a region where the black matrix 402 and the color filter 403 overlap. However, in FIG. 5, since the color filter 503 corresponding to the pixels does not overlap with the black matrix 502, a special over-coat layer 404 for planarizing the surface is not required.

As described above, because the color filter 503 does not overlap with the black matrix 502, a process may be simplified, and the cost may be reduced.

One example among methods for fabricating a sectional structure of the liquid crystal display panel illustrated in FIG. 5 involves the processes of: patterning a black matrix 502 formed of an organic film such as a resin material at a predetermined region extended from one end portion of a first transparent substrate 501 and at a boundary region of pixels; forming a color filter 503 so as to partially overlap with the black matrix 502, and correspond to a unit pixel; and eliminating the portion of the color filter where overlaps with the black matrix 502 by grinding may be performed.

As above, in the TN mode liquid crystal display panel illustrated in FIG. 5, because the black matrix 502 is formed of an organic film such as a resin material as a thick film on a transparent substrate 501 and applied as a color filter, chrome, a heavy metal harmful to the human body is not required to produce a liquid crystal display panel in the same manner as the TN mode liquid crystal display panel of FIG. 4.

In FIGS. 4 and 5, the TN mode liquid crystal display panel in which the common electrodes 405, 505 are formed on the first transparent substrates 401, 501 is described. A first embodiment of the present invention may also be applied to an IPS mode liquid crystal display panel that the common electrode 405, 505 is formed on a second transparent substrate 407, 507 produced as a thin film transistor array substrate.

Figure 6:
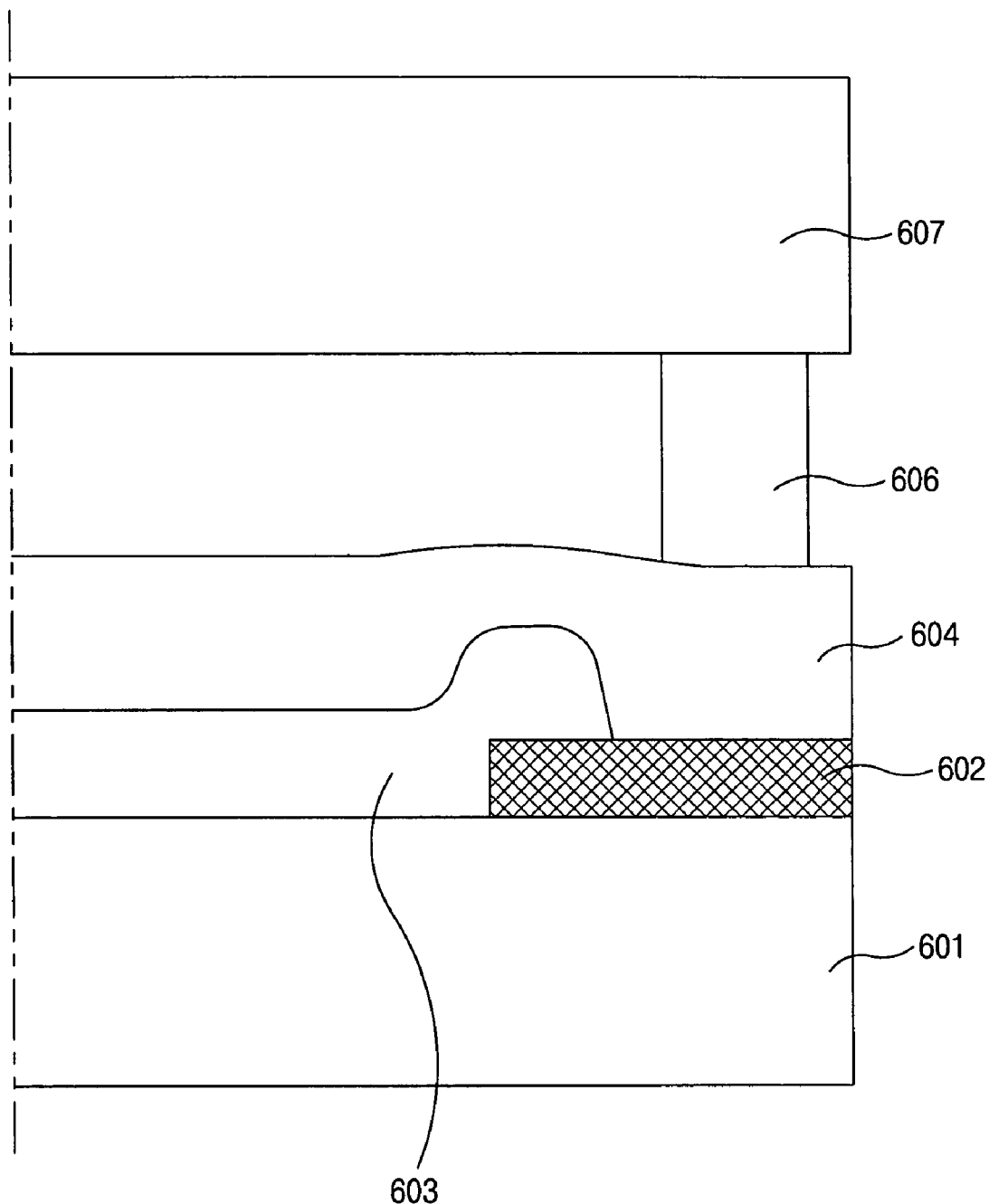
FIG. 6 is a sectional view illustrating the structure of an IPS mode liquid crystal display panel according to a first embodiment of the present invention.

FIG. 6 is an exemplary view illustrating a sectional structure of an IPS mode liquid crystal display panel according to a first embodiment of the present invention.

With reference to FIG. 6, the IPS mode liquid crystal display panel includes a black matrix 602 formed of an organic film such as a resin material, patterned at a predetermined region extended from one end portion of a first transparent substrate 601 and at a boundary region of pixels to prevent a leakage of light generated from a back-light, and preventing a color mixture of adjacent pixels; a red, green or blue color filter 603 partially overlapping with the black matrix 602 and formed to correspond to a unit pixel; an over-coat layer 604 formed at an entire surface of an upper part of a first transparent substrate 601 including the black matrix 602 and the color filter 603; a seal pattern 606 formed on a structure that the black matrix 602 and the over-coat layer 604 are laminated; and a second transparent substrate 407 attached to the first transparent substrate 601 by the seal pattern 606.

As above, on the first transparent substrate 601, the black matrix 602, the color filter 603 and the over-coat layer 604 except the common electrode 405 of FIG. 4 are formed, and the first transparent substrate is applied as a color filter substrate of an IPS mode liquid crystal display panel.

The black matrix 602 formed of an organic film such as a resin material is applied as a thick film. For example, for the black matrix 602, a colored organic series resin or the like such as acryl, epoxy, polyimide resin or the like including one of a carbon black material and a black pigment may be used.

A glass fiber or a glass ball added to the seal pattern 606 as a support member is added at a weight ratio of less than about 1% to a sealant. In case of adding glass balls, about 500 or fewer glass balls may be added so as to be distributed in at least one of unit areas of 1 mm×1 mm of the seal pattern 606. In case of adding a glass fiber, about 150 or fewer glass fibers may be added so as to be distributed in at least one of unit area of 1 mm×1 mm of the seal pattern 606. For example, in case of adding glass balls, a defect ratio may be about 0% when between about 0.01 and about 150 glass balls are distributed, a defect ratio may be about 5% when about 200 or fewer glass balls are distributed, a defect ratio may be about 10% when about 250 or fewer glass balls are distributed, a defect ratio may be about 30% when about 350 or fewer glass balls are distributed, a defect ratio may be about 40% when about 450 or fewer glass balls are distributed, a defect ratio may be about 50% when about 500 or fewer glass balls are distributed, and a defect ratio may be about 45% when about 550 or fewer glass balls are distributed. In case of adding the glass fibers having a diameter of about 5.2 μm and a length of about 20 μm, a defect ratio may be about 0% when about 0.01 to 30 glass fibers are distributed, a defective ratio may be about 10% when about 50 or fewer glass fibers are distributed, a defect ratio may be about 15% when about 75 or fewer glass fibers are distributed, a defect ratio may be about 30% when about 100 or less glass fibers are distributed, a defect ratio may be about 50% when about 150 or fewer glass fibers are distributed, and a defect ratio may be about 70% when about 200 or fewer glass fibers are distributed. And, the weight ratio of the support member may be about 0.95% to 0.005% to the sealant.

In addition, the number of glass ball or glass fiber support members may be varied according to their specific gravity or the desired weight ratio, and the number of glass fibers may be further varied according to their diameter or length. The diameter of the support member is the same as or greater than that of a spacer. If the diameter of the spacer is about 4.8 μm, the diameter of the support member is mostly about 3.6 to 7.5 μm.

The over-coat layer 604 is formed at the entire surface of the upper parts of the black matrix 602 and the color filter 603 in order to make the surface even. That is, as the black matrix 602 formed of an organic film such as a resin material is applied as a thick film, the over-coat layer 604 is formed of an organic film material in order to prevent deficiency in driving a liquid crystal layer which is due to step deficiency at a region where the black matrix 602 and the color filter 603 overlap. For example, epoxy, acryl or polyimide resin or the like may be used as the black matrix.

On the second transparent substrate 607, gate lines to which a scan signal is applied and data lines to which image information is applied intersect one another, so that a unit pixel is defined in a matrix form. At the intersection, a thin film transistor for switching the unit pixel is provided, and, at the unit pixel, a common electrode and a pixel electrode for driving a liquid crystal layer are provided. The second transparent substrate is applied as a thin film transistor array substrate of the IPS mode liquid crystal display panel.

The first transparent substrate 601 and the second transparent substrate 607 are provided with a cell-gap therebetween maintained by a spacer so as to be constantly separated from each other. The substrates 601 and 607 are attached to each other by the seal pattern 606, thus constituting a liquid crystal display panel. At a region where the first transparent substrate 601 and the second transparent substrate 607 are separated from each other, a liquid crystal layer is formed, and the seal pattern 606 may be formed at the first transparent substrate 601 or the second transparent substrate 607.

In forming a liquid crystal layer through a vacuum injection method, one side of the seal pattern 606 is formed to open so that it functions as a liquid crystal injection hole. In forming a liquid crystal layer through a dropping method, the seal pattern is formed to have a closed shape encompassing the outer edge of the image display part.

Figure 1:
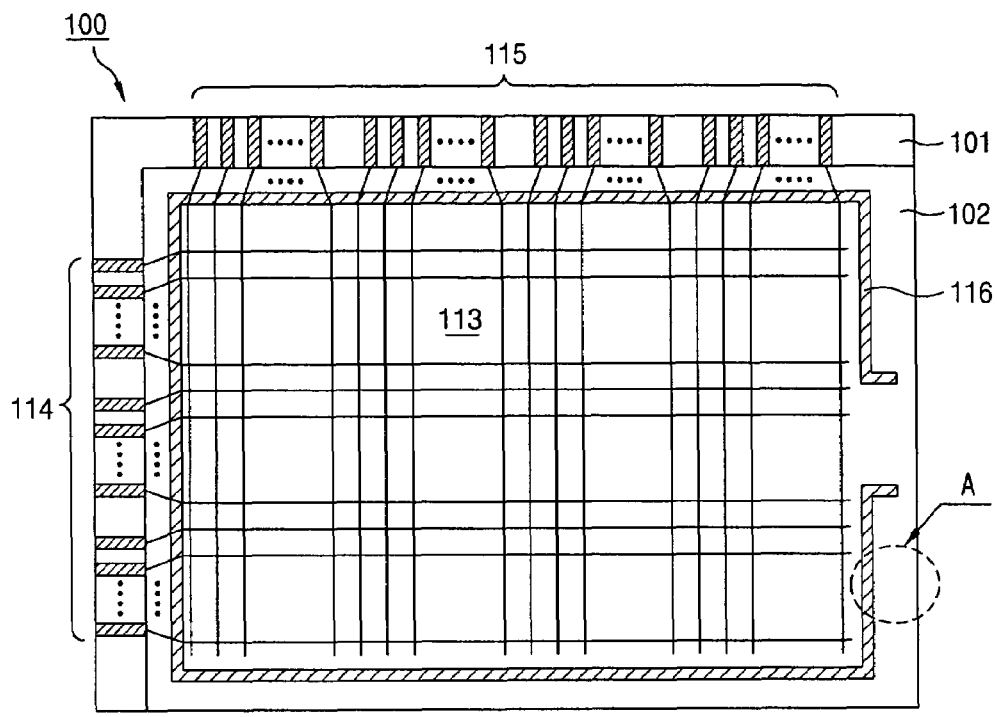
FIG. 1 is a plane view illustrating a structure of a liquid crystal display panel where a thin film transistor array substrate and a color filter substrate face into and are attached to each other.
Figure 2:
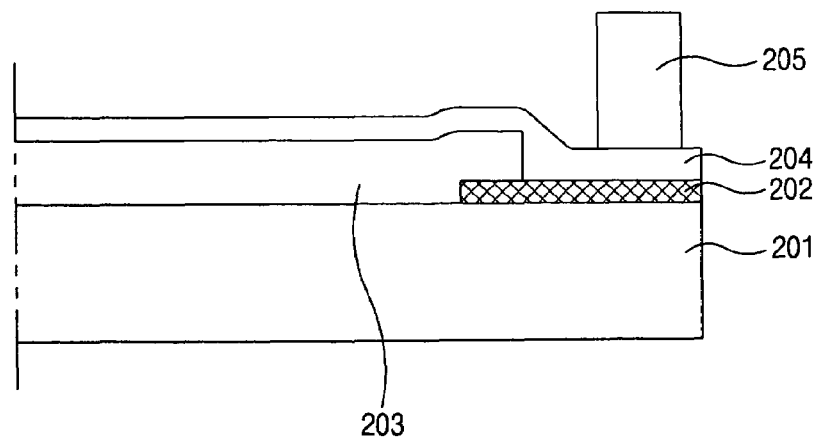
FIG. 2 is a sectional view illustrating the of a color filter substrate for a region 'A' of FIG. 1 in case of a TN mode liquid crystal display panel.
Figure 3:
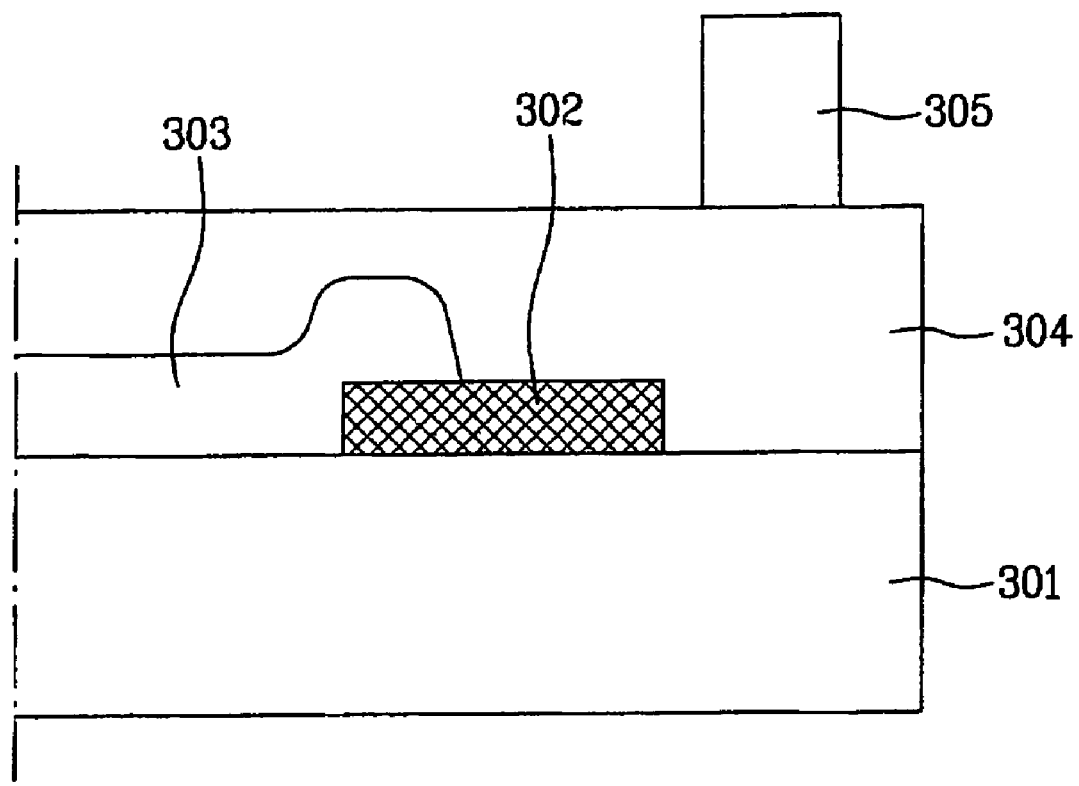
FIG. 3 is a sectional view illustrating the structure of a color filter substrate for a region 'A' of FIG. 1 in case of an IPS mode liquid crystal display panel.

In the related art, as shown in FIG. 3, since a region where the seal pattern 305 is formed and a region where the black matrix 302 is formed are required to be separate in a dummy area outside of an effective image display part of an IPS mode liquid crystal display panel, the size of the IPS mode liquid crystal display panel must be increased. In addition, since the black matrix 302 is not formed on the edge portion of the transparent substrate 301 where the seal pattern 305 is formed, light leak occurs at the edge portion of the transparent substrate 301 thereby degrading the image quality.

However, in the IPS mode liquid crystal display panel according to a first embodiment of the present invention, the seal pattern 606 is formed on the upper surface of over-coat layer 604 laminated on the surface of the black matrix 602 formed at a predetermined region extended from one end portion of the first transparent substrate 602. Therefore, the region where the seal pattern 606 is formed and the region where the black matrix 602 is formed are not required to be separate, whereby the dummy area outside of the effective image display part of the IPS mode liquid crystal display panel may be minimized.

In addition, since the black matrix 602 is extended to one end portion of the first transparent substrate 601 where the seal pattern 606 is formed, light leak may be avoided at the edge portion of the first transparent substrate 601, preventing the image quality of the liquid crystal display panel from being degraded.

Figure 7:
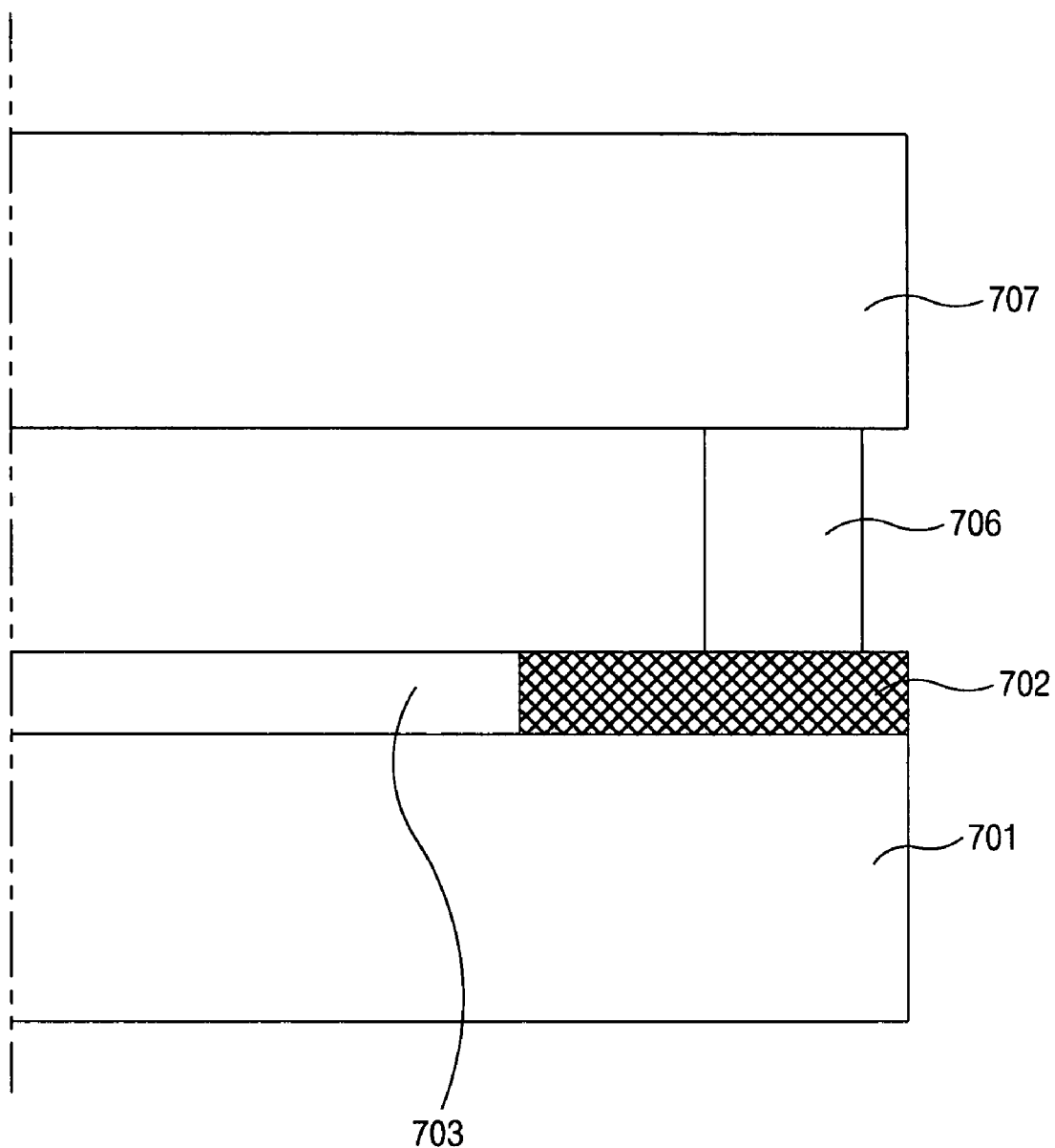
FIG. 7 is a sectional view illustrating the structure of an IPS mode liquid crystal display panel where an over-coat layer is not formed, in FIG. 6.

FIG. 7 is an exemplary view, of a sectional structure of a LCD device illustrating that the over-coat layer 604 is not formed in an IPS mode liquid crystal display panel according to the first embodiment of the present invention illustrated in FIG. 6.

With reference to FIG. 7, the IPS mode liquid crystal display panel includes a black matrix 702 formed of an organic film such as a resin material patterned at a predetermined region extended from one end portion of a first transparent substrate 701 and at a boundary region of pixels to prevent a leakage of light generated from a back light, and preventing a color mixture of adjacent pixels; a red, green or blue color filter 703 formed to correspond to the pixels; a seal pattern formed at the upper surface of the black matrix 702; and a second transparent substrate 707 attached to the first transparent substrate 701 by the seal pattern 706.

The over-coat layer 604 illustrated in FIG. 6 is not formed in a sectional structure of the liquid crystal display panel illustrated in FIG. 7 because the color filter 703 and the black matrix 702 do not overlap with each other.

That is, in FIG. 6, as the black matrix 602 formed of an organic film such as a resin material is applied as a thick film, the over-coat layer 604 is formed of an organic material to planarize the surface in order to prevent deficiency in driving a liquid crystal layer, which is due to step deficiency at a region where the black matrix 602 and the color filter 603 overlap. However, in FIG. 7, since the color filter 703 formed to correspond to pixels does not overlap with the black matrix 702, a special over-coat layer 604 for planarizing the surface is not required.

As described above, because the color filter 703 does not overlap with the black matrix 702, a process may be simplified, and the cost may be reduced.

One example of a method for fabricating a sectional structure of the liquid crystal display panel illustrated in FIG. 7 includes, the processes of: patterning a black matrix 702 formed of an organic film such as a resin material at a predetermined region extended from one end portion of a first transparent substrate 701 and at a boundary region of pixels; forming a color filter so as to partially overlap with the black matrix 702 and to correspond to a unit pixel; and eliminating the portion of the color filter which overlaps with the black matrix 502 by grinding.

In the IPS mode liquid crystal display panel illustrated in FIG. 7, the region where the seal pattern 706 is formed and the region where the black matrix 702 is formed are not individually required because the seal pattern 706 is formed at an upper surface of the black matrix 706 formed at a predetermined area extended from one end portion of the first transparent substrate 701. Accordingly, a dummy area outside of an effective image display part of the IPS mode liquid crystal display panel may be reduced in the same manner as in the IPS mode liquid crystal display panel of FIG. 6.

In addition, since the black matrix 702 is extended to the one end portion of the first transparent substrate 701 where the seal pattern 706 is formed, a leakage of light may be prevented at the edge portion of the first transparent substrate 701, thereby preventing the image quality of the liquid crystal display panel from being degraded.

The black matrix 702 is formed of an organic film such as a resin material. For example, a colored organic series resin or the like such as acryl, epoxy or polyimide resin or the like including one of carbon black or a black pigment may be used for the black matrix.

A glass fiber or a glass ball used as a support member may be added to the seal pattern 706 is at a weight ratio of less than about 1% to a sealant. In the case of adding glass balls, about 500 or less glass balls are distributed in at least one of unit areas of about 1 mm×1 mm of the seal pattern 706. When adding glass fiber, about 150 or fewer glass fibers are distributed in at least one of unit areas of 1 mm×1 mm of the seal pattern. For example, when adding the glass balls, a defect ratio may be about 0% when about 0.01 to about 150 glass balls are distributed, a defect ratio may be about 5% when about 200 or fewer glass balls are distributed, a defect ratio may be about 10% when about 250 or fewer glass balls are distributed, a defect ratio may be about 30% when about 350 or fewer glass balls are distributed, a defect ratio may be about 40% when about 450 or fewer glass balls are distributed, a defect ratio may be about 50% when about 500 or fewer glass balls are distributed, and a defect ratio may be about 45% when about 550 or fewer glass balls are distributed. When adding glass fibers having a diameter of about 5.2 μm and a length of about 20 μm, a defect ratio may be about 0% when about 0.01 to about 30 glass fibers are distributed, a defect ratio may be about 10% when about 50 or fewer glass fibers are distributed, a defect ratio may be about 15% when about 75 or fewer glass fibers are distributed, a defect ratio may be about 30% when about 100 or fewer glass fibers are distributed, a defect ratio may be about 50% when about 150 or fewer glass fibers are distributed, and a defect ratio may be about 70% when about 200 or fewer glass fibers are distributed. And, the weight ratio of the support member may be about 0.95% to about 0.005% to the sealant.

In addition to varying the number of glass balls or glass fibers, the support member may be varied according to specific gravity or the weight ratio of the support member, and in the case of glass fibers, may be varied according to their diameter or a length thereof. The diameter of the support member is the same as or greater than that of a spacer. If the diameter of the spacer is about 4.8 μm, the diameter of the support member is mostly about 3.6 to about 7.5 μm.

Figure 8:
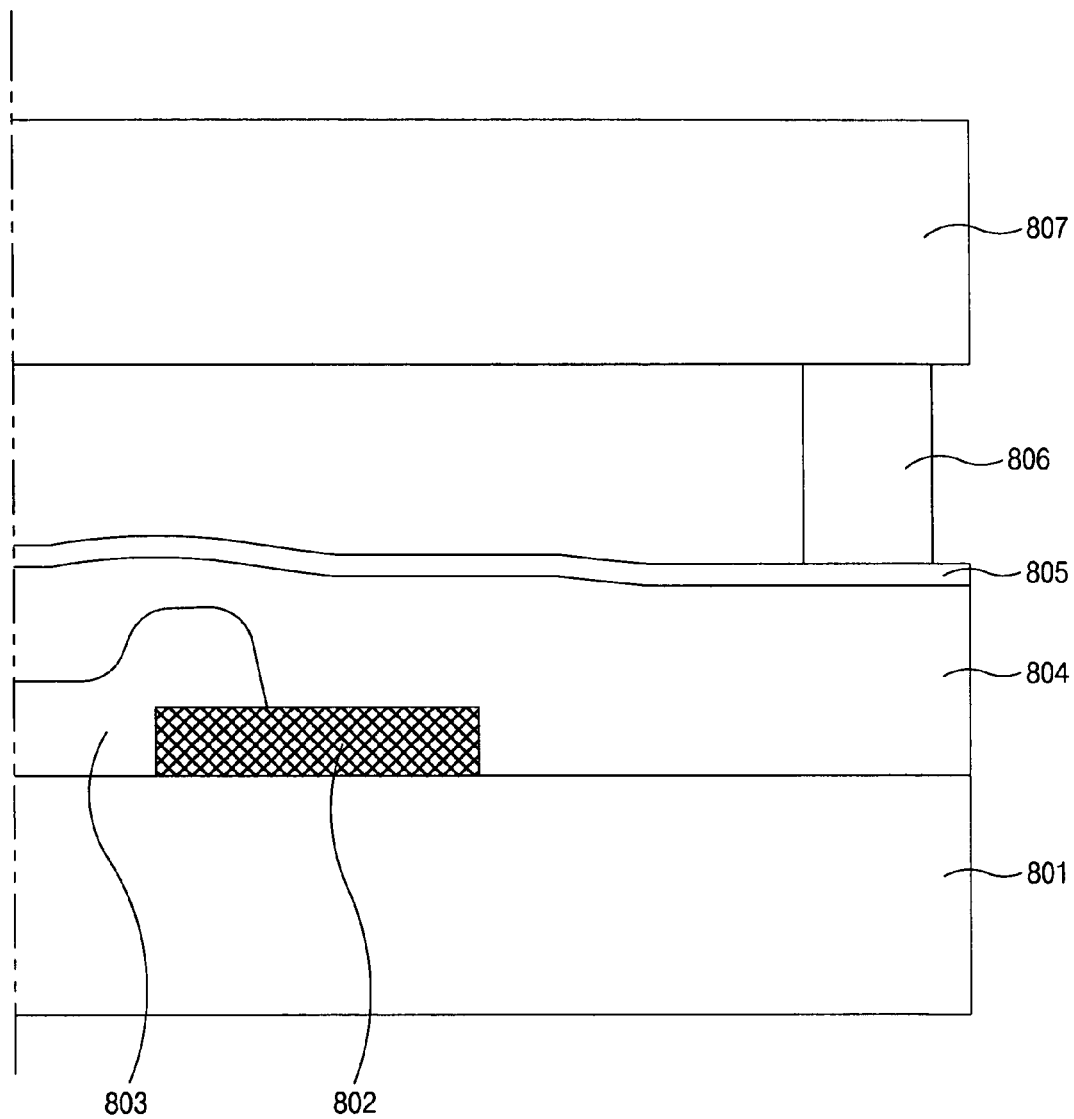
FIG. 8 is a sectional view illustrating the structure of a TN mode liquid crystal display panel according to a second embodiment of the present invention.

FIG. 8 is an exemplary view illustrating a sectional structure of a TN mode liquid crystal display panel according to a second embodiment of the present invention.

With reference to FIG. 8, the TN mode liquid crystal display panel includes a black matrix 802 formed of an organic film such as a resin material patterned at a predetermined region extending from one end portion of a first transparent substrate 801 and at a boundary region of pixels to prevent a leakage of light generated from a back-light, and to prevent a mixture of colors from the adjacent pixels; a red, green or blue color filter 803 partially overlapping with the black matrix 802, and formed to correspond to a unit pixel; an over-coat layer 804 formed at an entire surface of an upper part of a first transparent substrate 801 including the black matrix 802 and the color filter 803; a common electrode 805 formed at an upper surface of the over-coat layer 804; a seal pattern 806 formed on a structure that the over-coat layer 804 formed on the edge portion of the first transparent substrate 801 and the common electrode 805 are laminated; and a second transparent substrate 807 attached to the first transparent substrate 801 by the seal pattern 806.

As described above, on the first transparent substrate 801, the black matrix 802, the color filter 803, the over-coat layer 804 and the common electrode 805 are formed, and the first transparent substrate 801 is applied as a color filter substrate of the TN mode liquid crystal display panel.

The black matrix 802 is formed of an organic film such as a resin material. For example, a colored organic series resin or the like such as acryl, epoxy or polyimide resin or the like including one of a carbon black material or a black pigment may be used.

A glass fiber or a glass ball as a support member added to the seal pattern 806 is added at a weight ratio of less than about 1% to a sealant. If glass balls are used as support members, 500 or fewer glass balls are distributed in at least one of unit area of 1 mm×1 mm of the seal pattern 806. If glass fibers are used, 150 or fewer glass fibers are distributed in at least one of unit area of 1 mm×1 mm of the seal pattern. For example, for glass balls, a defect ratio may be 0% when about 0.01~150 glass balls are distributed, a defect ratio may be 5% when about 200 or fewer glass balls are distributed, a defect ratio may be 10% when about 250 or fewer glass balls are distributed, a defect ratio may be 30% when about 350 or fewer glass balls are distributed, a defect ratio may be 40% when about 450 or fewer glass balls are distributed, a defect ratio may be 50% when about 500 or fewer glass balls are distributed, and a defect ratio may be about 45% when about 550 or fewer glass balls are distributed. In case of adding the glass fibers having a diameter of 5.2 μm and a length of 20 μm, a defect ratio may be about 0% when about 0.01~30 glass fibers are distributed, a defect ratio may be about 10% when about 50 or fewer glass fibers are distributed, a defect ratio may be about 15% when about 75 or fewer glass fibers are distributed, a defect ratio may be about 30% when about 100 or fewer glass fibers are distributed, a defective ratio may be about 50% when about 150 or fewer glass fibers are distributed, and a defect ratio may be about 70% when about 200 or fewer glass fibers are distributed. And, the weight ratio of the support member may be about 0.95% to about 0.005% to the sealant.

In addition to varying the number of the glass balls or glass fibers, the support member may be varied according to its specific gravity or weight ratio. The glass fibers may be further varied by their diameter or a length thereof. The diameter of the support member is the same as or greater than that of a spacer. If the diameter of the spacer is about 4.8 μm, the diameter of the support member is mostly about 3.6 to about 7.5 μm.

The over-coat layer 804 is formed at the entire surface of the upper parts of the black matrix 802 and the color filter 803 in order to planarize the surface. That is, if the black matrix 802 formed of an organic film such as a resin material is applied as a thick film, the over-coat layer 804 is formed of an organic film material in order to reduce defects in driving a liquid crystal layer caused by step deficiencies at a region where the black matrix 802 and the color filter 803 overlap. For example, an organic material, such as epoxy, acryl or polyimide resin or the like may be applied.

On the second transparent substrate 807, gate lines to which a scan signal is applied and data lines to which image information is applied intersect one another, so that a unit pixel is defined in a matrix form. At the intersection, a thin film transistor for switching the unit pixel is provided, and, at the unit pixel, a pixel electrode for driving a liquid crystal layer with a common electrode 805 formed at the first transparent substrate 801 is provided. The second transparent substrate is applied as a thin film transistor array substrate of the liquid crystal display panel.

The first transparent substrate 801 and the second transparent substrate 807 are provided with a cell-gap therebetween maintained by a spacer so as to be constantly separated from each other. They are attached to each other by the seal pattern 806 to form a liquid crystal display panel. At a region where the first transparent substrate 801 and the second transparent substrate 807 are separated from each other, a liquid crystal layer is formed, and the seal pattern 806 may be formed at the first transparent substrate 801 or the second transparent substrate 807.

When forming a liquid crystal layer through a vacuum injection method, one side of the seal pattern 806 is formed to open so that it functions as a liquid crystal injection hole. In case of forming a liquid crystal layer through a dropping method, the seal pattern is formed to have a closed pattern shape to encompass the outer edge of the image display part.

In the TN mode liquid crystal display panel according to the second embodiment of the present invention, because a black matrix 802 formed of an organic film such as a resin material is formed of a thick film on the first transparent substrate 801 applied as a color filter substrate, chrome, heavy metal harmful to the human body for producing a liquid crystal display panel can be prevented from use in the related art in the same manner as the TN mode liquid crystal display panel according to the first embodiment of the present invention.

In the TN mode liquid crystal display panel according to the second embodiment of the present invention, the seal pattern 806 is formed on a structure including the over-coat layer 804 formed on the edge portion of the first transparent substrate 801 and the common electrode 805, but one side of the seal pattern 806 may partially overlap with the black matrix 802.

Figure 9:
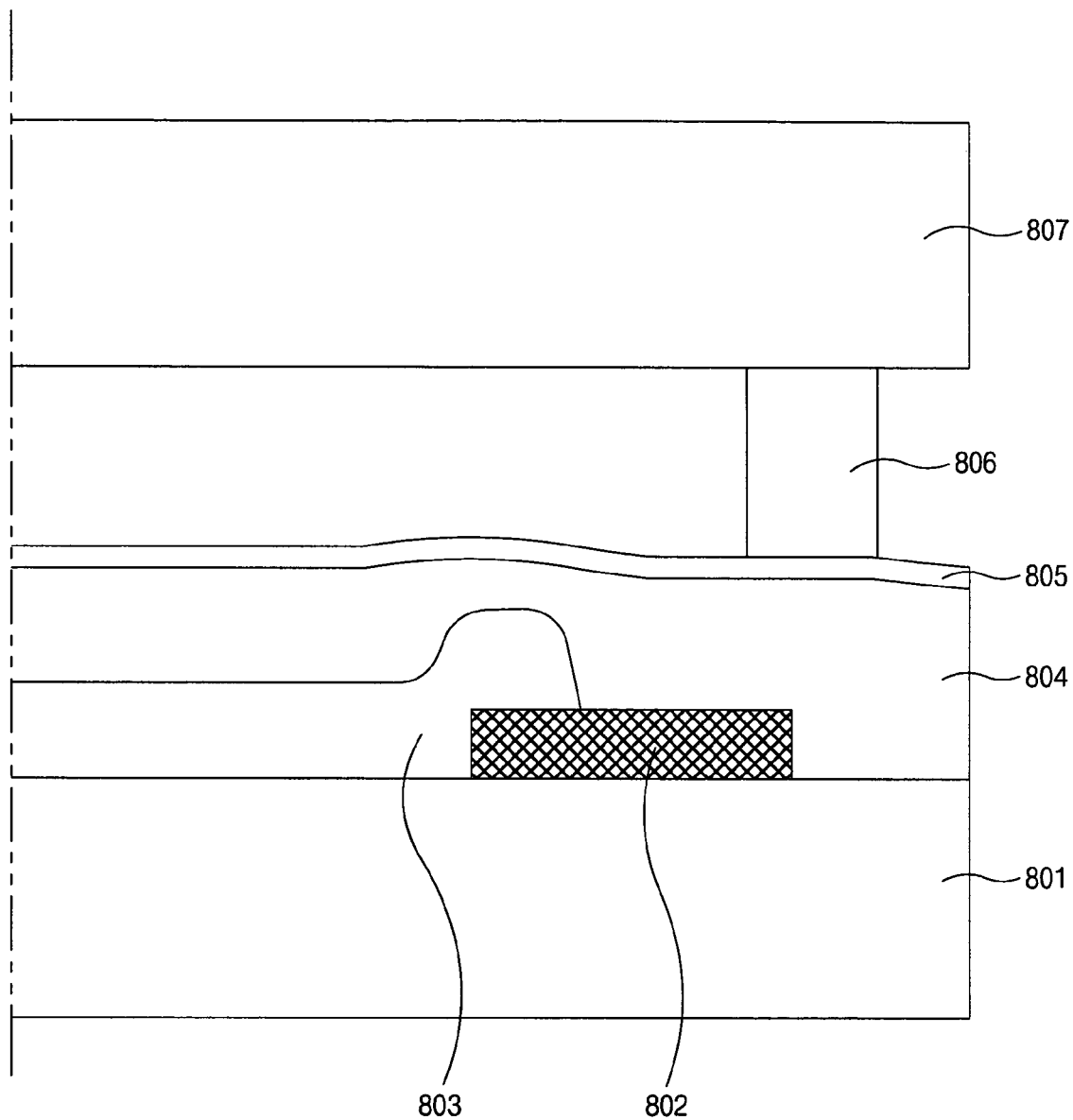
FIG. 9 is a sectional view illustrating the structure of a TN mode liquid crystal display panel in which one side of a seal pattern partially overlaps with a black matrix, in FIG. 8.

FIG. 9 is a exemplary view illustrating a sectional structure in which one side of the seal pattern 806 partially overlaps with the black matrix 802 in the TN mode liquid crystal display panel according to the second embodiment of the present invention illustrated in FIG. 8.

FIG. 9 illustrates a sectional structure in which one side of the seal pattern 806 partially overlaps with the black matrix 802 in the TN mode liquid crystal display panel in which a common electrode 805 is formed on a first transparent substrate 801 produced as a color filter substrate. But, this sectional structure may also be applied to an IPS mode liquid crystal display panel in which a common electrode 805 is formed on a second transparent substrate 807.

Figure 10:
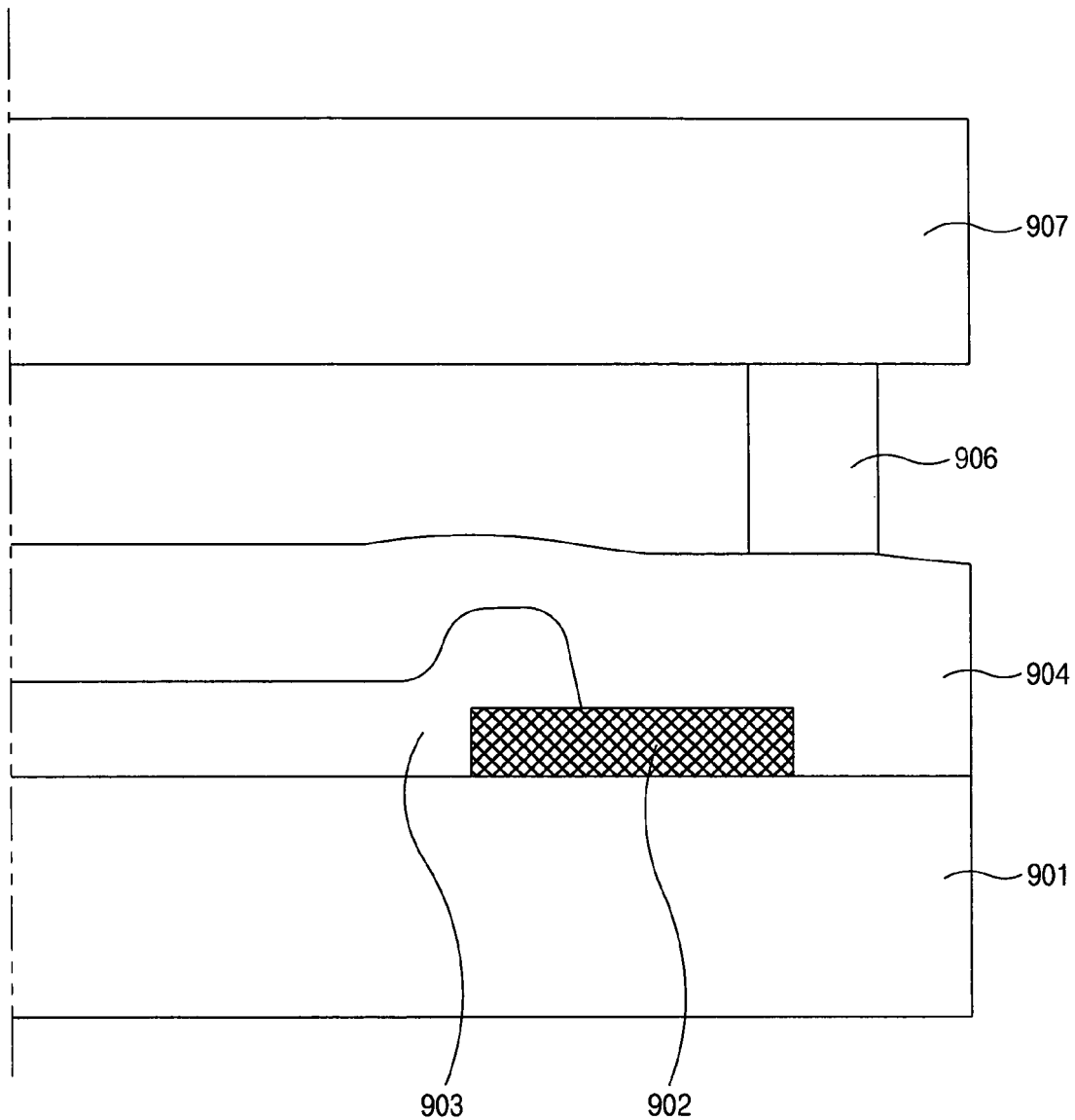
FIG. 10 is a sectional view illustrating the structure of an IPS mode liquid crystal display panel in which one side of a seal pattern partially overlaps with a black matrix, in FIG. 9.

FIG. 10 is an exemplary view illustrating a sectional structure that one side of a seal pattern partially overlaps with a black matrix in an IPS mode liquid crystal display panel according to the second embodiment of the present invention.

With reference to FIG. 10, a black matrix 902, a color filter 903 and an over-coat layer 904 are formed on a first transparent substrate 901 in the same manner as in the exemplary view of FIG. 9 except the common electrode 805 of FIG. 9. The seal pattern 906 is formed at an upper surface of the over-coat layer 904 formed on the edge portion of the first transparent substrate 901 so as to partially overlap with the black matrix 902.

A second transparent substrate 907 is attached to the first transparent substrate 901 by the seal pattern 906.

As mentioned above, on the first transparent substrate 901, the black matrix 902, the color filter 903 and the over-coat layer 904 except the common electrode 805 of FIG. 8 are formed, and the first transparent substrate 901 is applied as a color filter substrate of an IPS mode liquid crystal display panel.

The black matrix 902 is formed of an organic film such as a resin material. For example, a colored organic series resin or the like such as acryl, epoxy or polyimide resin or the like including one of a carbon black material or a black pigment may be used for the black matrix.

A glass fiber or a glass ball as a support member added to the seal pattern 906 is added at a weight ratio of fewer than 1% to a sealant. In case of adding a glass ball, 500 or fewer glass balls are distributed in at least one of unit areas of 1 mm×1 mm of the seal pattern 906. In case of adding a glass fiber, 150 or fewer glass fibers are distributed in at least one of unit areas of 1 mm×1 mm of the seal pattern. For example, in case of adding the glass balls, a defect ratio may be about 0% when about 0.01 to about 150 glass balls are distributed, a defect ratio may be about 5% when about 200 or fewer glass balls are distributed, a defect ratio may be about 10% when about 250 or fewer glass balls are distributed, a defect ratio may be about 30% when about 350 or fewer glass balls are distributed, a defect ratio may be about 40% when about 450 or fewer glass balls are distributed, a defect ratio may be about 50% when about 500 or fewer glass balls are distributed, and a defect ratio may be about 45% when about 550 or fewer glass balls are distributed. In case of adding the glass fibers having a diameter of about 5.2 μm and a length of about 20 μm, a defect ratio may be about 0% when about 0.01 to about 30 glass fibers are distributed, a defect ratio may be about 10% when about 50 or fewer glass fibers are distributed, a defect ratio may be about 15% when about 75 or fewer glass fibers are distributed, a defect ratio may be about 30% when about 100 or fewer glass fibers are distributed, a defect ratio may be about 50% when about 150 or fewer glass fibers are distributed, and a defect ratio may be about 70% when about 200 or fewer glass fibers are distributed. And, the weight ratio of the support member may be about 0.95% to about 0.005% to the sealant.

In addition to varying, the number of glass balls or glass fibers, a support member may be varied according to a specific gravity or a weight ratio of the support member, and the number of glass fibers may be varied according to a diameter or a length thereof. The diameter of the support member is the same as or greater than that of a spacer. If the diameter of the spacer is about 4.8 μm, the diameter of the support member is mostly about 3.6 to about 7.5 μm.

The over-coat layer 904 is formed at the entire surface of the upper part of the black matrix 902 and the color filter 903 in order to make the surface even. That is, as the black matrix 902 formed of an organic film such as a resin material is applied as a thick film, the over-coat layer 904 is formed of an organic film material in order to prevent deficiency in driving a liquid crystal layer which is due to step deficiency at a region where the black matrix 902 and the color filter 903 overlap. For example, as the organic material, epoxy, acryl or polyimide resin or the like may be applied.

On the second transparent substrate 907, gate lines to which a scan signal is applied and data lines to which image information is applied intersect one another, so that a unit pixel is defined in a matrix form. At the intersection, a thin film transistor for switching the unit pixel is provided, and, at the unit pixel, a pixel electrode and a common electrode for driving a liquid crystal layer formed at the first transparent substrate 801 are provided. The second transparent substrate is applied as a thin film transistor array substrate of the IPS mode liquid crystal display panel.

The first transparent substrate 901 and the second transparent substrate 907 are provided with a cell-gap therebetween maintained by a spacer so as to be constantly separated from each other, are attached to each other by the seal pattern 906, and thus constitute a liquid crystal display panel. At this time, a liquid crystal layer is formed at a region where the first transparent substrate 901 and the second transparent substrate 907 are separated from each other, and the seal pattern 906 may be formed at the first transparent substrate 901 or the second transparent substrate 907.

When forming a liquid crystal layer through a vacuum injection method, one side of the seal pattern 906 is formed to open so that it functions as a liquid crystal injection hole. In case of forming a liquid crystal layer through a dropping method, the seal pattern is formed to have a closed pattern shape to encompass the outer edge of the image display part.

In the related art, as shown in FIG. 3, since at a dummy area except an effective image display part of an IPS mode liquid crystal display panel, a region where the seal pattern 305 is formed and a region where the black matrix 302 is formed are individually required, there is an increase in size of the IPS mode liquid crystal display panel.

However, in the IPS mode liquid crystal display panel according to the second embodiment of the present invention, as the seal pattern 906 is formed at an upper surface of the over-coat layer 904 formed on the edge portion of the first transparent substrate 901 so as to partially overlap with the black matrix 902. A region where the seal pattern 906 is formed and a region where the black matrix 902 is formed partially overlap with each other, so that a dummy area except an effective image display part of an IPS mode liquid crystal display panel may be reduced.

In the TN mode liquid crystal display panel according to the first embodiment and the second embodiment of the present invention above, as the black matrix is formed of an organic film such as a resin material, use of chrome, a heavy metal harmful to the human body, for producing a liquid crystal display panel may be prevented from use.

In the IPS mode liquid crystal display panel according to the first embodiment of the present invention, a seal pattern is formed at an upper surface of the over-coat layer laminated on a black matrix formed at a predetermined area extended from one end portion of a substrate. Therefore a region where the seal pattern is formed and a region where the black matrix is formed are not individually required, so that a dummy area except an effective image display part of the IPS mode liquid crystal display panel may be minimized. In addition, since the black matrix is extended to one end portion of the substrate where the seal pattern is formed, a leakage of light can be prevented at the edge portion of the substrate so that a degradation of an image quality of the liquid crystal display panel may be prevented.

In the IPS mode liquid crystal display panel according to the second embodiment of the present invention, a seal pattern is formed at an upper surface of an over-coat layer formed on the edge portion of a substrate so as to partially overlap with a black matrix. Accordingly a region where the seal pattern is formed and a region where the black matrix is formed partially overlap with each other, so that a dummy area except an effective image display part of the IPS mode liquid crystal display panel is reduced, and thus the size of the liquid crystal display panel may be minimized.

In a liquid crystal display panel according to the present invention, a process of forming a black matrix with an organic film such as a resin material may be identically applied in producing a color filter substrate of both TN mode liquid crystal display panel and IPS mode liquid crystal display panel, so that process control becomes easy, and efficiency is improved on using a clean-room. In addition, by controlling the number or the ratio of a support member added to the seal pattern, an adhesion between the seal pattern and the black matrix formed of a resin material is improved, so that the image quality of the liquid crystal display panel may be prevented from being degraded or a deficiency may be prevented from occurring.

It will be apparent to those skilled in the art that various modifications and variation can be made in the liquid crystal display panel of the present invention without departing from the spirit or the inventions. Thus, it is intended that the present invention covers the modifications and variations of this invention provided they come within the scope of the appended claims and their equivalents.

What is claimed is:

1. A liquid crystal display panel, comprising:
    a black matrix of a resin material surrounding a display area of the liquid crystal display panel, disposed at a predetermined region of extended from one end portion of a first substrate to a boundary region of a plurality of pixels;
    a color filter corresponding to a unit pixel, said color filter partially overlapping the black matrix surrounding the display area;
    a seal pattern at an upper surface of the black matrix, the seal pattern overlapping the black matrix; and
    a second substrate attached to the first substrate by the seal pattern,
    wherein a support member is added to the seal pattern at a weight of about 0.005% to less than 0.1% to a sealant, and wherein the support member includes glass balls or a glass fibers, and about 500 or fewer of glass balls are applied in an unit area of 1 mm$^2$ of the seal pattern, or about 150 or fewer of glass fibers are applied in an unit area of 1 mm$^2$ of the seal pattern.

2. The liquid crystal display panel of claim 1, wherein the black matrix is extended at least from the seal pattern-formed region to one end portion of the first substrate.

3. The liquid crystal display panel of claim 1, wherein the black matrix partially overlaps with the seal pattern.

4. The liquid crystal display panel of claim 1, further comprising:
    a common electrode on the black matrix,
    wherein the seal pattern is at an upper surface of the common electrode.

5. The liquid crystal display panel of claim 4, wherein the black matrix is extended at least from the seal pattern-formed region to one end portion of the first substrate.

6. The liquid crystal display panel of claim 4, wherein the black matrix partially overlaps with the seal pattern.

7. The liquid crystal display panel of claim 1, further comprising:
    an over-coat layer on the first substrate including the black matrix and the color filter,
    wherein the seal pattern is on a structure including the black matrix and the over-coat layer.

8. The liquid crystal display panel of claim 7, wherein the black matrix partially overlaps with the seal pattern.

9. The liquid crystal display panel of claim 7, wherein the black matrix is located at least from the seal pattern-formed region to one end portion of the first substrate.

10. The liquid crystal display panel of claim 1, further comprising:
    an over-coat layer on the first substrate including the black matrix and the color filter; and
    a common electrode on the over-coat layer,
    wherein the seal pattern is on a structure including the black matrix, the over-coat layer and the common electrode.

11. The liquid crystal display panel of claim 10, wherein the black matrix partially overlaps with the seal pattern.

12. The liquid crystal display panel of claim 10, wherein the black matrix extends at least from the seal pattern-formed region to one end portion of the first substrate.

13. A liquid crystal display panel comprising:
    a black matrix of a resin material surrounding a display area of the liquid crystal display panel;
    a color filter partially overlapping the black matrix surrounding the display area, said color filter corresponding to a unit pixel;
    an over-coat layer on the first substrate having the black matrix and the color filter;
    a seal pattern on a structure that the black matrix and the over-coat layer are laminated the seal pattern overlapping the black matrix; and
    a second substrate attached to the first substrate by the seal pattern,
    wherein a support member is added to the seal pattern at a weight of about 0.005% to less than 0.1% to a sealant, and wherein the support member includes glass balls or a glass fibers, and about 500 or fewer of glass balls are applied in an unit area of 1 mm$^2$ of the seal pattern, or about 150 or fewer of glass fibers are applied in an unit area of 1 mm$^2$ of the seal pattern.

14. The liquid crystal display panel of claim 13, wherein one side of the seal pattern does not overlap with the black matrix.

15. The liquid crystal display panel of claim 13, further comprising:
    a common electrode on the over-coat layer, wherein the seal pattern is on the common electrode.

16. The liquid crystal display panel of claim 15, wherein one side of the seal pattern does not overlap with the black matrix.

17. A liquid crystal display panel comprising:
- a first substrate on which a plurality of pixel electrodes are formed to define a pixel area;
- a second substrate attached to the first substrate with intermediation of a liquid crystal layer;
- a seal pattern at peripheral portions of the first substrate and the second substrate; and
- a black matrix of a resin material, the black matrix being on the second substrate so as to encompass the seal pattern-formed region, the black matrix obscuring a region extending from one end portion of the first substrate to a boundary of the pixel area, wherein a support member is added to the seal pattern at a weight of about 0.005% to less than 0.1% to a sealant, and wherein the support member includes glass balls or a glass fibers, and about 500 or fewer of glass balls are applied in an unit area of 1 mm$^2$ of the seal pattern, or about 150 or fewer of glass fibers are applied in an unit area of 1 mm$^2$ of the seal pattern.

* * * * *